United States Patent [19]

Abe et al.

[11] Patent Number: 4,975,848
[45] Date of Patent: Dec. 4, 1990

[54] DIAGNOSIS SYSTEM FOR A MOTOR VEHICLE

[75] Inventors: Kunihiro Abe; Tomoya Kobayashi, both of Tokyo, Japan

[73] Assignee: Fuji Jukogyo Kabushiki Kaisha, Tokyo, Japan

[21] Appl. No.: 463,794

[22] Filed: Jan. 5, 1990

Related U.S. Application Data

[63] Continuation of Ser. No. 245,748, Sep. 16, 1988, abandoned.

[30] Foreign Application Priority Data

Sep. 22, 1987 [JP] Japan .................................. 62-238536

[51] Int. Cl.[5] ....................... G01M 15/00; G06F 15/20
[52] U.S. Cl. ............................ 364/424.03; 364/551.01; 73/116; 73/118.1; 371/6.4
[58] Field of Search ..................... 364/431.03, 431.12, 364/424.03, 424.04, 551.01, 570; 73/116, 118.1; 340/52 R, 52 F, 534; 371/15, 20; 324/73 R, 73 AT

[56] References Cited

U.S. PATENT DOCUMENTS

| | | | |
|---|---|---|---|
| 4,108,358 | 8/1978 | Niemaszyk et al. | 371/20 |
| 4,159,531 | 6/1979 | McGrath | 364/424.04 |
| 4,234,921 | 11/1980 | Kinoshita et al. | 364/431.01 |
| 4,404,639 | 9/1983 | McGuire et al. | 364/424.04 |
| 4,567,756 | 2/1986 | Colborn | 73/118.1 |
| 4,694,408 | 9/1987 | Zaleski | 73/116 |
| 4,748,843 | 6/1988 | Schäfer et al. | 73/117.3 |

FOREIGN PATENT DOCUMENTS 58-12848 1/1983 Japan .

Primary Examiner—Parshotam S. Lall
Assistant Examiner—V. Trans
Attorney, Agent, or Firm—Martin A. Farber

[57] ABSTRACT

An electronic control system for controlling an automotive engine has an identification code for designating the type of the electronic control system and the code is stored in a memory. Memory in a computer has a plurality of programs for diagnosing various types of electronic control systems. The computer is connected to the electronic control system. The identification code stored in the memory of the electronic control system is read out by the computer. In response to the read out identification code, a diagnosis program corresponding to the code is selected. The system is arranged to diagnose the signals in accordance with the selected program.

4 Claims, 4 Drawing Sheets

DIAGNOSIS SYSTEM FOR A MOTOR VEHICLE

This application is a continuation of our co-pending application Ser. No. 07/245,748 filed Sept. 16, 1988 now abandoned.

BACKGROUND OF THE INVENTION

The present invention relates to a trouble diagnosis system for a motor vehicle.

Recently, a motor vehicle has been equipped with an electronic control system for controlling various components of an engine, such as fuel injectors, thereby improving driveability, exhaust gas emission, fuel consumption, and engine power. The electronic control system controls the components based on information represented by output signals from various sensors for detecting engine operating conditions. Accordingly, if malfunctions of components and sensors occur, the engine does not properly operated.

However, because of the complexity of the electronic control system, it is difficult to immediately find out trouble. Accordingly, a trouble diagnosis device for easily checking the electronic control system should be equipment in an auto shop.

Japanese Patent Application Laid-Open No. 58-12848 discloses a diagnosis system in which a checking device is provided for measuring a pulse duration of fuel injection and an engine speed, and for checking whether idling speed is normal.

However, the system is provided for diagnosing only a designated type of motor vehicle by using an exclusive checking device.

In order to diagnose various vehicles, it is necessary to provide several types of checking devices corresponding to respective types of motor vehicles.

Further, a diagnosis system which stores a plurality of programs for diagnosing various types of motor vehicles has been proposed. In such a system, a code representing a type of an electronic control system provided in a vehicle to be diagnosed must be inputted the diagnosis system. However, it is troublesome work to confirm the corresponding type code and to input the code consisting of a plurality of bits.

SUMMARY OF THE INVENTION

An object of the present invention is to provide a diagnosis system which has an excellent operability with a low cost.

Another object is to provide a system whereby diagnosis may be easily performed without selecting a corresponding program from a large number of programs by a diagnostician.

According to the present invention, there is provided a diagnosing system for a motor vehicle controlled by an electronic control system having storing means for storing an identification code signal for designating the type of the electronic control system.

The diagnosis system comprises a computer having a central processing unit and memorizing means for memorizing a plurality of programs for diagnosing various types of electronic control systems respectively, connecting means connecting the computer to the electronic control system, first means for reading the identification code signal stored in the storing means, select means responsive to the read out the identification code signal for selecting a diagnosis program corresponding to the code signal, second means for receiving data from the electronic control system in accordance with the selected program, and display means for displaying received data in a form of diagnosis data.

In an aspect of the invention, the diagnosis programs are stored in the memorizing means detachably attached to the computer.

The other objects and features of this invention will become understood from the following description with reference to the accompanying drawings.

DETAILED DESCRIPTION OF THE PREFERRED EMBODIMENT

Figure 1:
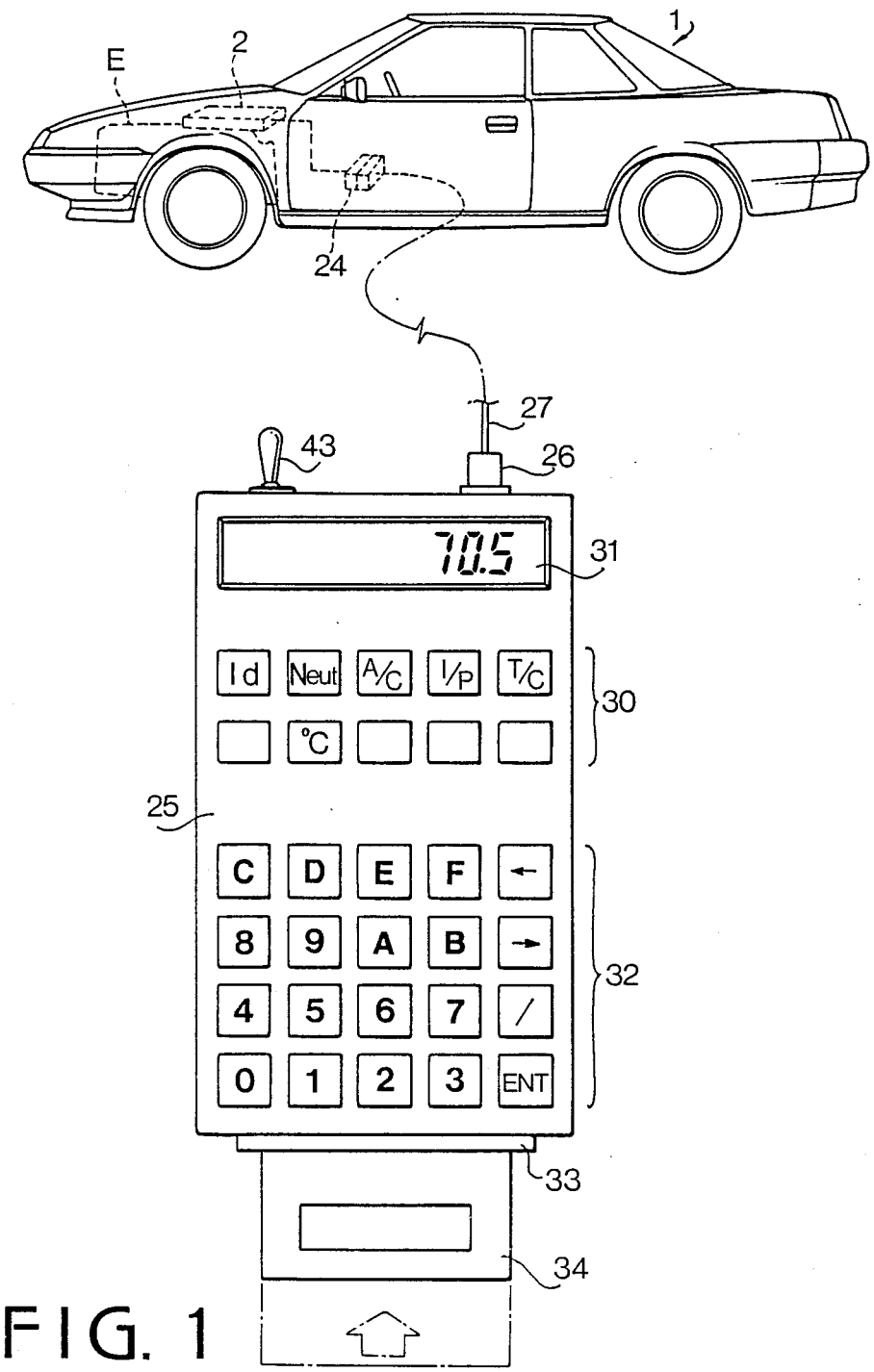
FIG. 1 is a schematic illustration of a diagnosis system according to the present invention.

Referring to FIG. 1, an automobile 1 is equipped with an electronic control system 2 for controlling various components of an engine E. The electronic control system 2 is connected to an external connector 24. A portable diagnosis device 25 comprising a microcomputer has a connector 26, to which the connector 24 of the system 2 is connected through an adapter harness 27.

The diagnosis device 25 has a power switch 43, a liquid crystal display 31, an indicator section 30 consisting of a plurality of indicators of LED, and a keyboard 32. A connector 33 is provided for connecting a detachable memory cartridge 34.

Figure 2A:
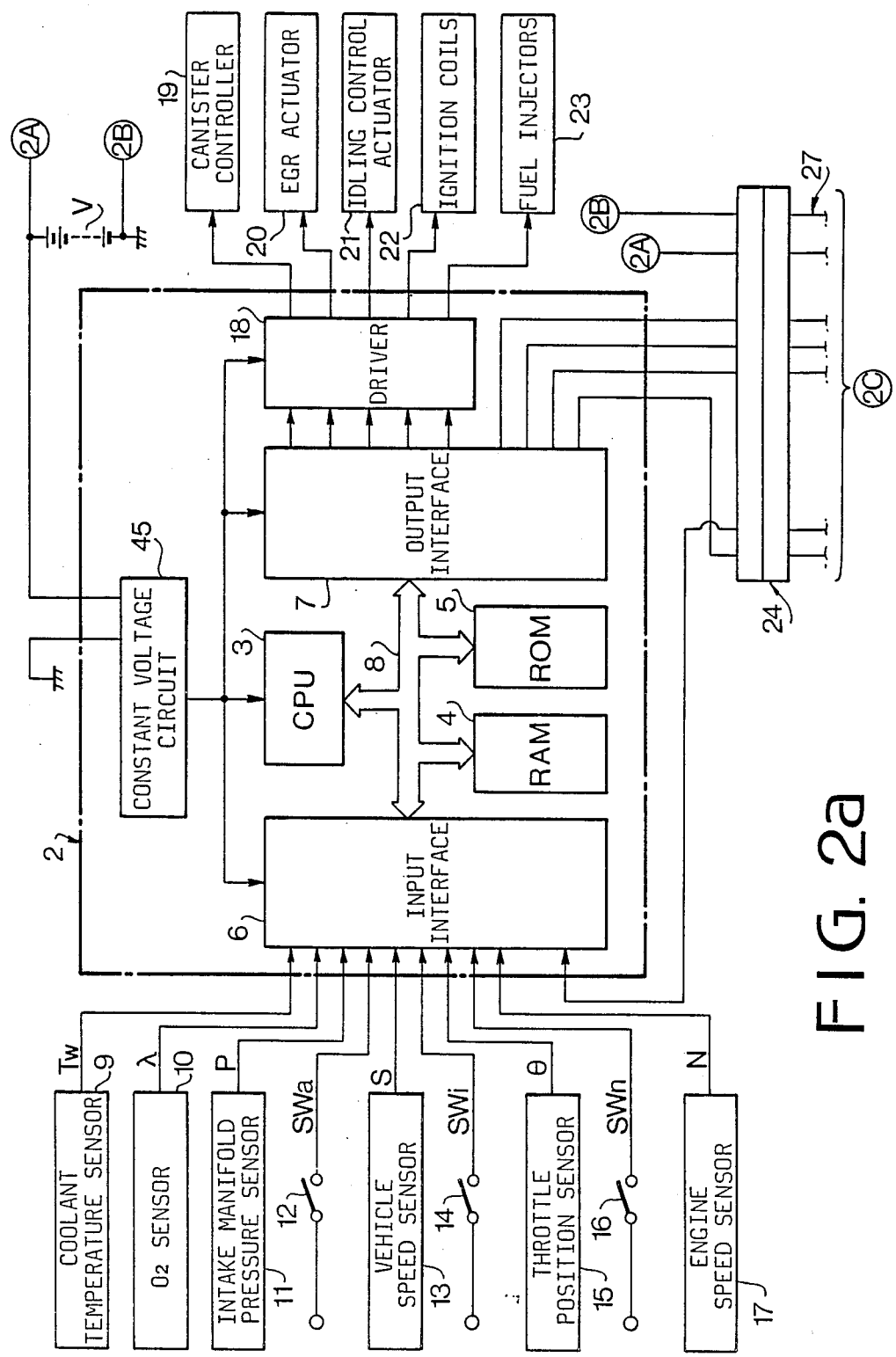
FIGS. 2a and 2b show a block diagram of the system.
Figure 2B:
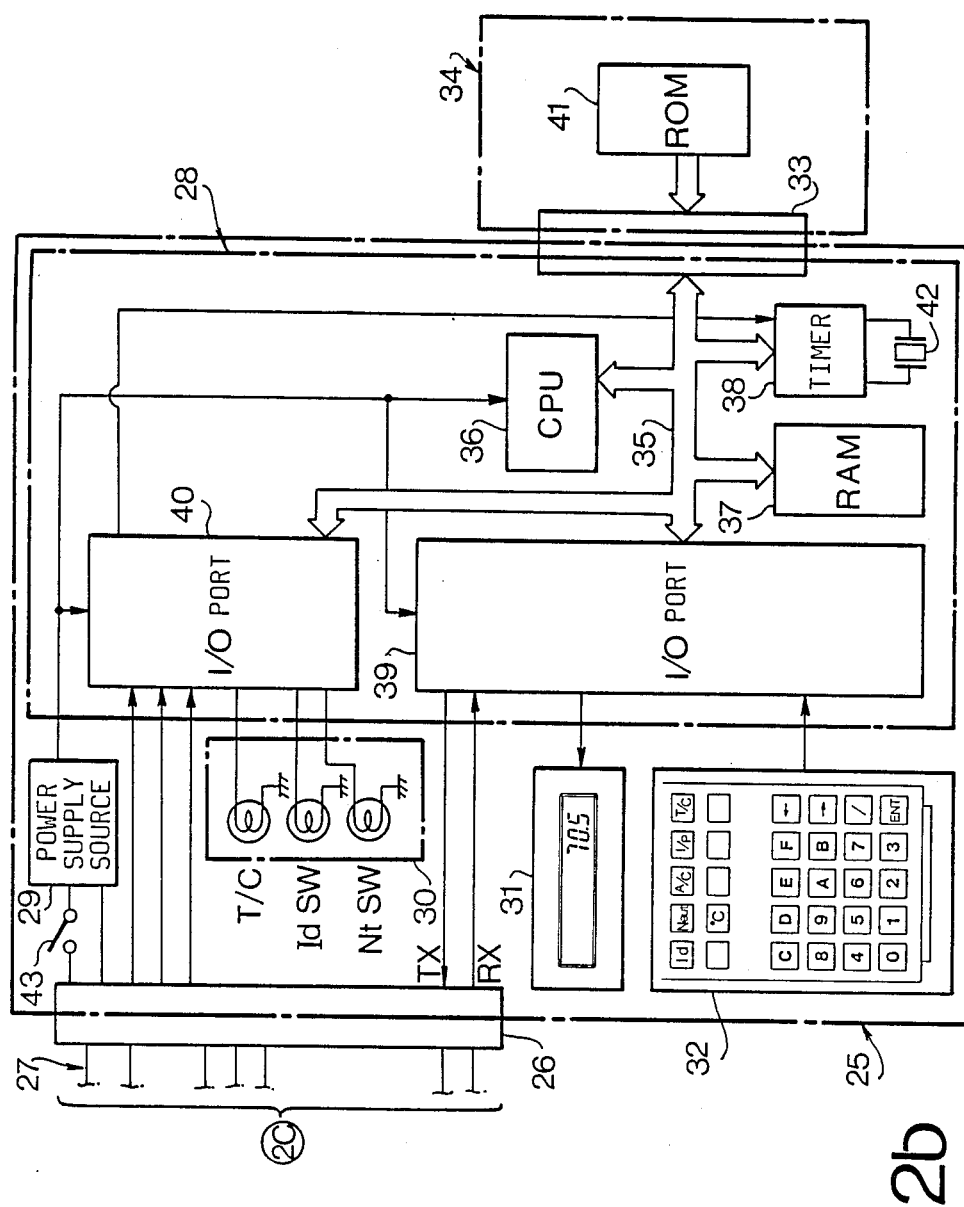

Referring to FIGS. 2a and 2b, the electronic control system 2 comprises a central processor unit (CPU) 3, a random access memory (RAM) 4, a read only memory (ROM) 5, an input interface 6 and an output interface 7. The CPU 3, RAM 4, ROM 5, input and output interfaces 6 and 7 are connected to each other through a bus line 8. Programs and data for controlling the engine are stored in the ROM 5. In accordance with the present invention, a system identification code for identifying the type of the control system 2 is stored in the ROM 5. Power is supplied to the CPU 3, input and output interfaces 6 and 7, and driver 18 from a source V through a constant voltage circuit 45.

The input interface 6 is applied with a coolant temperature signal Tw from a coolant temperature sensor 9, an air-fuel ratio feedback signal from an $O_2$ sensor 10, an intake-air pressure signal P from an intake manifold pressure sensor 11, an air conditioner operating signal SWa from an air conditioner switch 12, a vehicle speed signal S from a vehicle speed sensor 13, an idling signal SWi from an idle switch 14, a throttle valve opening degree signal 8 from a throttle position sensor 15, a neutral positioning signal SWn from a neutral switch 16 in a transmission, and an engine speed signal N from an engine speed sensor 17. These signals are stored in the RAM 4 after data processing in accordance with the program stored in the ROM 5. The CPU 3 produces respective control signals, which are applied to the driver 18 through the output interface 7. The driver 18 produces signals for controlling a canister controller 19 of a fuel-vapor emission control system, an EGR (exhaust gas recirculation system) actuator 20, an idling control actuator 21, ignition coils 22, and fuel injectors 23.

The diagnosis device 25 has a control unit 28 and a power supply source 29. The control unit 28 comprises a CPU 36, a RAM 37, a timer 38 consisting of a counter, and input/output (I/O) ports 39 and 40. These elements are connected to each other through a bus line 35. A clock pulse generator 42 is provided for generating synchronizing pulses to be fed to the timer 38. A ROM 41 provided in a memory cartridge 34 is connected to the bus line 35 through the connector 33. The ROM 41 stores a plurality of programs for diagnosing a plurality of types of control systems 2, respectively. Inputs of the I/O port 40 are connected to the output interface 7 of the control system 2 through connectors 24 and 26 and harness 27. Outputs of the port 40 are connected to the indicator section 30 and the timer 38. Inputs of the I/O port 39 are connected to the keyboard 32 for applying a mode select signal dependent on the operation of the keyboard, and to the output interface 7. Outputs of the port 39 are connected to the input interface 6 and the display 31. The power source 29 for supplying the power to the CPU 36 and I/O ports 39 and 40 is connected to the source V through the power switch 43.

Figure 3:
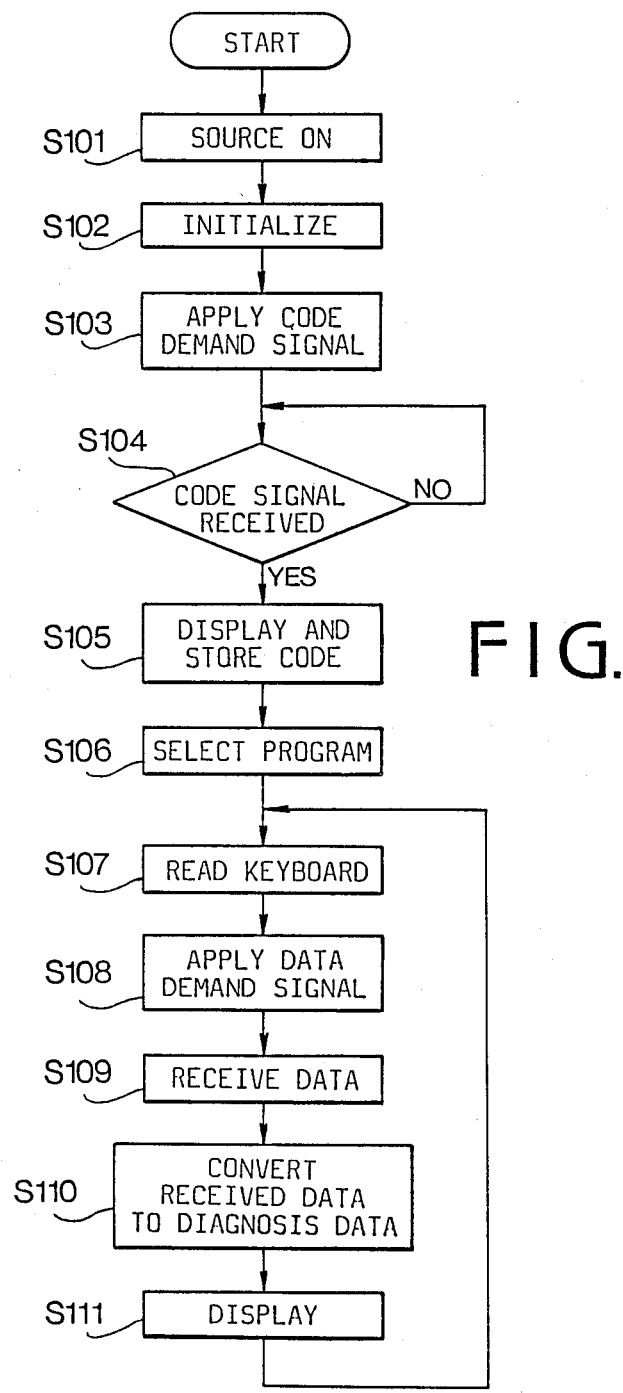
FIG. 3 is a flowchart showing an operation of the system.

The operation of the system is described hereinafter with reference to the flowchart of FIG. 3. The diagnosis device 25 is connected to the electronic control system 2 through the connectors 24, 26 and harness 27. The engine is started, and the following diagnosis program is performed under the condition of running of the engine.

The power switch 43 is turned on at a step S101. At a step S102, initialization of the control unit 28 is performed. At a step S103, an identification code demand signal from the control unit 28 is applied to the system 2. In response to the code demand signal, the control system 2 looks up an identification code signal stored in the ROM 5 which is fed to the control unit 28. At a step S104, it is determined whether the code signal is applied to the control unit 28 or not. If the code signal is applied, the program proceeds to a step S105. If not, the program of step S104 is repeated. At step S105, a received code is displayed on the display 31 and stored in a predetermined address of the RAM 37. At a step S106, in accordance with the received code, a program for the type of the control system 2 is selected from the ROM 41 in the cartridge 34. Thus, a diagnosis routine is performed in accordance with the program.

However, if a corresponding program to the received code is not stored, an error is displayed on the display 31 at step S104. In this case, the cartridge 34 is changed into another one which may store the corresponding program and the operation of step S104 is repeated. Thereafter, a diagnostician operates the keyboard 32 to perform the diagnosis of the engine. For example, in order to measure the coolant temperature, a mode code or mark for the coolant temperature (for example F→0→7→ENT) is input by operating the keyboard 32.

At a step S107, the input mode is read by the control unit 28. At a step S108, a corresponding data demand signal TX is applied to the system 2. At a step S109, data signal RX representing a coolant temperature is applied to the unit 28 from the control system 2. At a step S110, the received binary digit is converted into a decimal digit representing the coolant temperature. At a step S111, a measured value of the temperature, for example, 70.5 is displayed on the display 31 and LED for a mark °C. in one of the displays in the indicator section 30 is emitted to represent that the value 70.5 is centigrade. Thus, the diagnostician can diagnose the items about the coolant temperature.

In order to perform other diagnosis items, the keyboard operation is performed and operations after step S107 are repeated.

Although the power is supplied from the control system 2 to the diagnosis device 25 in the above-described system, a power source for operating the diagnosis device 28 may be provided in the diagnosis device.

From the foregoing it will be understood that the diagnosis of the engine can be performed without inputting an identification code signal for the engine, so that the diagnosis can be easily performed without fail.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A diagnosis system for a motor vehicle controlled by an electronic control system having storing means for storing an identification code signal for designating the type of said electronic control system, the diagnosis system comprising:
   a computer having a central processing unit and memorizing means storing a plurality of diagnosis programs for diagnosing various types of electronic control systems;
   connecting means connecting said computer to said electronic control system;
   type discriminating means for reading said identification code signal stored in said storing means of the electronic control system;
   program select means responsive to the read out identification code signal for selecting a diagnosis program from said diagnosis programs;
   data demand means for applying a data demand signal to said electronic control system in accordance with the selected program;
   data receiving means for receiving data from said electronic control system; and
   display means for displaying received data in a form of diagnosis data.

2. A diagnosis system for diagnosing an electronic control system for an automotive engine mounted on a vehicle.
   said electronic control system having sensing means for detecting operating conditions of the engine and control means for storing input data from said sensing means and providing output data for controlling the engine, and
   said diagnosis system having a control unit responsive to said output data for diagnosing said output data and for providing diagnosis data, display means for displaying said diagnosis data, a keyboard for inputting a diagnosis mode into said control unit, connecting means for connecting said control unit with said electronic control system, a detachable memory cartridge detachably connected to said control unit for storing a plurality of programs for diagnosing said output data, and storing means for storing an identification code signal for designating a type of the electronic control system, comprising:
   type discriminating means for reading said identification code signal stored in said storing means of the type of the electronic control system; and
   program select means responsive to a read out identification code signal for automatically selecting said program so as to diagnose said output data and to display results of said diagnosis data.

3. A diagnosis system for an electronic control system of an automobile engine mounted on a vehicle, the control system having sensing means for detecting operating conditions of the engine, input means for storing input data from said sensing means and providing output data for controlling the engine, and storing means storing an identification code signal representing the type of said electronic control system, the diagnosis system comprising:

diagnosis means including a control unit responsive to said output data for diagnosing said output data and for providing diagnosis data;

display means for displaying said diagnosis data;

a keyboard for inputting a diagnosis mode into said control unit;

a detachable memory cartridge detachably connected to said diagnosis means for storing a plurality of programs for diagnosing various types of electronic control systems;

connecting means for connecting said diagnosis means with said electronic control system;

type discriminating means for reading said identification code signal stored in said storing means provided in said electronic control system, said identification code signal being provided in response to a demand signal sent from said diagnosis system; and program selecting means provided in said diagnosis means responsive to said read out identification code signal for automatically selecting one of said diagnosis programs specific to said type of said electronic control system.

4. A diagnosis system for an electronic control system of an automobile, the control system having means for sensing operating conditions of the automobile, means providing output data for controlling the automobile, and storing means storing an identification code signal representing the type of said electronic control system, the diagnosis system comprising:

diagnosis means including a control unit responsive to said output data for diagnosing said output data and for providing diagnosis data;

display means for displaying said diagnosis data;

a keyboard for inputting a diagnosis mode into said control unit;

a memory connected to said diagnosis means for storing a plurality of programs employed by said diagnosis means for diagnosing various types of electronic control systems;

connecting means for connecting said diagnosis means with said electronic control system;

type discriminating means for reading said identification code signal stored in said storing means provided in said electronic control system; and wherein said diagnosis means includes program selecting means responsive to said identification code signal for automatically selecting one of said diagnosis programs specific to said type of said electronic control system for operation of said diagnosis means.

* * * * *